No. 700,337. Patented May 20, 1902.
L. KIRLIN.
TWO-ROW CULTIVATOR.
(Application filed Jan. 20, 1902.)

(No Model.) 2 Sheets—Sheet 1.

Witnesses:
A. W. McArthur
Geo. W. McDougall

Inventor:
Linden Kirlin
By Fischer & Thorpe, attys.

No. 700,337. Patented May 20, 1902.
L. KIRLIN.
TWO-ROW CULTIVATOR.
(Application filed Jan. 20, 1902.)
(No Model.) 2 Sheets—Sheet 2.

Witnesses: Inventor:
Linden Kirlin
By Fischer & Thorpe, Attys.

UNITED STATES PATENT OFFICE.

LINDEN KIRLIN, OF KANSAS CITY, MISSOURI.

TWO-ROW CULTIVATOR.

SPECIFICATION forming part of Letters Patent No. 700,337, dated May 20, 1902.

Application filed January 20, 1902. Serial No. 90,416. (No model.)

*To all whom it may concern:*

Be it known that I, LINDEN KIRLIN, a citizen of the United States, residing at Kansas City, in the county of Jackson and State of Missouri, have invented certain new and useful Improvements in Two-Row Cultivators, of which the following is a specification.

My invention relates to improvements in two-row cultivators; and my object is to provide means for operating the disks and shovels which will locate the levers close to the seat, so the driver can conveniently operate them without leaving the latter. Heretofore the operating-levers have usually been mounted upon the tongues in order to prevent the connecting-bar securing them to the disk and shovel shafts from interfering with the free movement of the seat-plank. This construction required the driver to stop the machine at the end of each row and walk first from one lever to the other in order to raise the shovels and disks from the ground. Then after turning the machine to go back he would have to repeat the above operation in order to again lower the disks and shovels to a working position. By employing my construction the levers are located close to the seat, so that it is unnecessary for the driver to leave the latter in order to operate them.

A further object is to lighten the draft of the machine to a minimum, and thus diminish the work of the draft-animals. I accomplish this desirable result by the peculiar arrangement and construction of the runners and carrying-wheels, whereby the machine is balanced without the use of tongues generally employed for this purpose. By arranging the carrying-wheels at the rear of the runners just back of the center of gravity of the machine almost the entire weight of the latter is carried on the wheels, the runners being employed chiefly to take the place of tongues in preserving the equilibrium of the machine.

Figure 1:
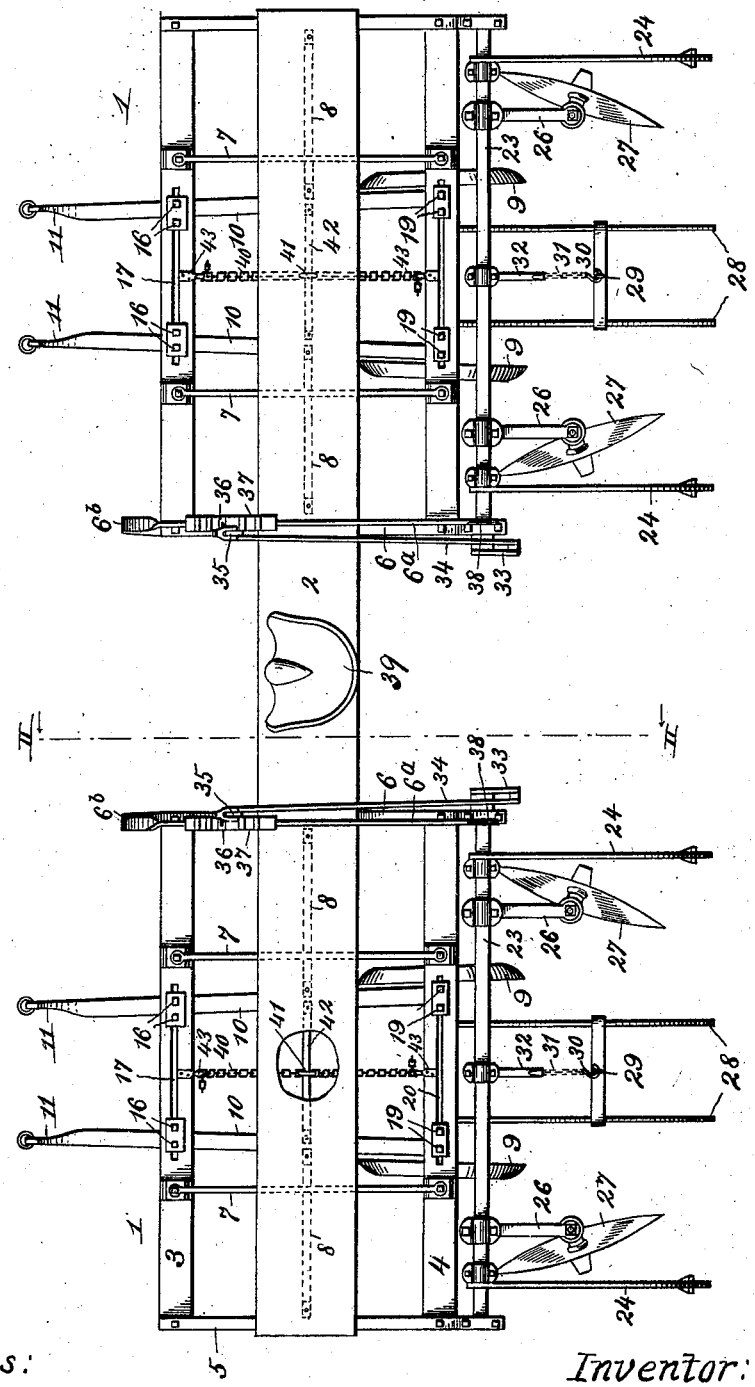
Figure 2:
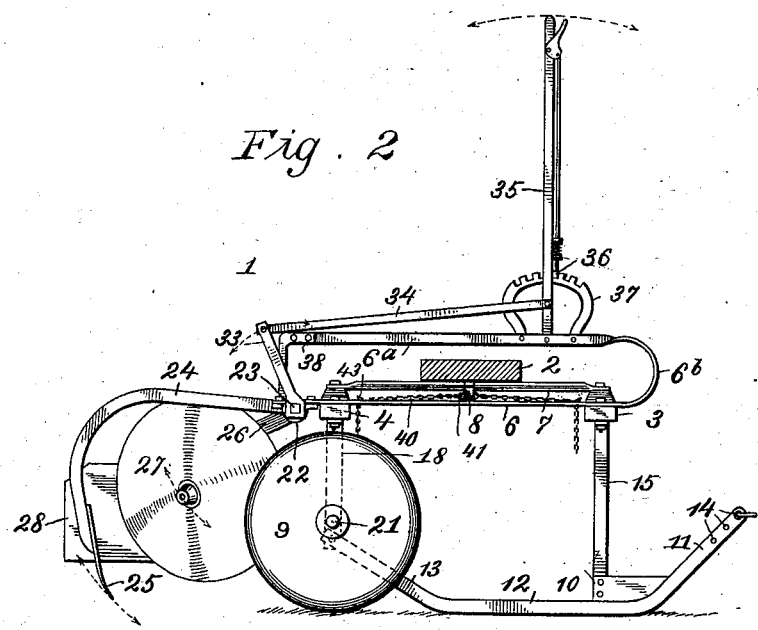
Figure 3:
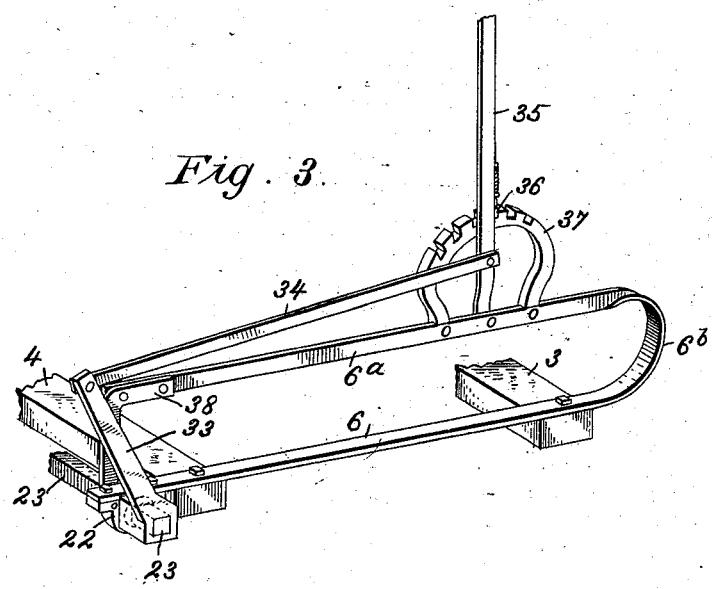

In the accompanying drawings, which illustrate the invention, Figure 1 represents a plan view of a cultivator embodying my improvements. Fig. 2 is a cross-section of the same, taken on line II II of Fig. 1, showing how the disks and shovels may be raised or lowered, as indicated by arrows, by throwing the operating-lever forward or backward in the direction shown by the dotted arrow. Fig. 3 is a detail perspective view of the mechanism for operating the disk and shovel shaft.

As shown by the drawings, I employ two gangs or sections 1 1, loosely connected by a seat-plank 2 in the usual manner, so that each gang will be free to follow its respective row without interfering one with the other. The frame of each gang consists of two parallel longitudinal bars 3 4, firmly secured together by transverse bars 5 6 and intermediate rods 7, to the latter of which the seat-plank is loosely secured by loops 8. The frames are mounted upon wheels 9 and runners 10, the latter consisting of angle-irons bent upwardly at their forward converging ends 11 at an angle approximating forty-five degrees, longitudinal central portions 12, and rear portions 13, which are bent upwardly at an angle of about twenty degrees. The upper front portions of the runners have series of holes 14 to adjustably receive equalizing-bars. (Not shown.) By bending the opposite ends of the runners upwardly in this manner they will move over the ground with less friction than if said ends contacted therewith, and consequently materially lighten the draft of the machine. The forward portions of the runners are rigidly secured to the lower ends of standards 15, adjustably secured at their upper ends to bars 3 by bolts 16, located in longitudinal slots 17. Their rear ends are rigidly secured to the lower ends of standards 18, adjustably secured to bar 4 by bolts 19, located in slots 20 in said bar. By unloosening bolts 16 19 the runners, together with the carrying-wheels, may be spread farther apart or brought closer together to accommodate the furrows over which the machine is intended to work. Also rigidly secured to the lower portions of standards 18 are stub-shafts 21, upon which are journaled the carrying-wheels 9. By referring to the drawings it will be seen that the carrying-wheels are placed slightly to the rear of the center of gravity of the machine and will therefore carry almost the entire weight of the latter, and the runners being thus relieved will glide over the ground with but very little friction, their chief purpose being to balance the machine. By thus maintaining the equilibrium of the cultivator by runners instead of the tongues usually employed it is apparent that the necks and shoulders of the draft-animals will be relieved of a large portion of the weight of the machine, particularly in descending a grade or in passing over rough ground, and they can therefore devote all of their energy to drawing the machine forward.

The rear ends of the transverse bars 5 6 are provided with boxes 22 to receive a journaled shaft 23, upon which are adjustably mounted shovel-beams 24, provided at their rear ends with the customary shovels 25. Also adjustably mounted upon said shaft are arms 26, carrying adjustably-mounted disks 27 at their rear ends.

28 designates the customary fenders employed for protecting the young plants from damage by clods, &c. They are provided with eyebolts 29 to receive hooks 30, provided with chains 31, adapted to be adjustably secured to the hooked terminals of arms 32, secured to shafts 23, for the purpose of adjustably securing the fenders in any desired position. The adjacent ends of shafts 23 are provided with rigidly secured crank-arms 33, which extend upwardly to receive pivotally-secured connecting-bars 34, pivotally secured at their forward terminals to operating-levers 35, fulcrumed at their lower ends to the upper portions 6$^a$ of bars 6. Bar 6 is bent a half-circle at 6$^b$ and then extends rearwardly and is secured to the upper portion of an inverted-L-shaped casting 38, fastened at its lower end to box 22, and thus forms a loop to permit the free movement of the seat-plank 2.

By providing the above construction levers 35 are brought close to the seat 39, so the driver can conveniently manipulate them at the end of each row without leaving the seat.

The seat-plank is adjustably secured upon the horizontal transverse rods 7 by chains 40, having large centrally-located links 41, which loosely embrace loop-bars 42, secured to the under side of the seat-plank, so the latter will be free to slide endwise upon rods 7. The opposite portions of the chains are removably secured to hooks 43, located upon longitudinars 3 4, in order that the seat-plank may be secured either forward or to the rear of the position shown in the drawings. This adjustment of the seat-plank is necessary, because in traveling on the road more weight must be thrown upon the runners, which act as brakes and prevent the machine from running on the horses. Then when working in the field the disks may be depressed to the desired depth by adjusting the seat-plank forward or backward.

Although I have shown the disk-arms secured to shaft 23, it is obvious that by substituting bar-iron similar to shaft 23 for longitudinal bars 3 4 the disk-arms could also be secured thereto, if desired, without departing from the spirit and scope of the invention.

From the above description it is apparent that I have produced a cultivator which is evenly balanced, light of draft, convenient to operate, and thoroughly practical for the purpose intended.

Having thus described my invention, what I claim as new, and desire to secure by Letters Patent, is—

1. In a cultivator comprising two gangs secured together by a seat-plank, shafts journaled at the rear ends of the gangs and provided with shovel-beams, loop-bars secured to the adjacent ends of the gangs, through which the seat-plank operates, levers pivotally secured to the upper portions of the loop-bars, means for retaining the levers in any desired position, crank-arms secured to the adjacent ends of the shafts, and connecting-bars pivotally secured at their opposite terminals to the levers and the crank-arms, substantially as described.

2. In a cultivator of the class described, loop-bars secured to the adjacent ends of the gangs, boxes secured to the rear ends thereof, shafts journaled therein carrying disks, cranks secured to the adjacent ends of said shafts, levers fulcrumed to the upper portions of the loop-bars, and connecting-bars pivotally secured at their opposite ends to the cranks and the levers, substantially as described.

3. In a cultivator of the class described, loop-bars secured to the adjacent ends of the gangs, journaled shafts mounted on the gangs carrying suitable cultivating appliances, cranks secured to the adjacent ends of said shafts, levers fulcrumed to the loop-bars, and connecting-bars pivotally secured at their opposite ends to the cranks and the levers, substantially as described.

4. In a cultivator, a seat-plank, gangs adjustably secured to the same, standards extending downwardly from the gang-frames, runners bent upwardly at their opposite ends and secured to the lower terminals of the standards, carrying-wheels mounted upon stub-shafts projecting from the rear standards just in the rear of the center of gravity of the machine, and means for adjusting the seat-plank so that all or any portion of the weight of the machine may be balanced on said wheels, substantially as described.

In testimony whereof I affix my signature in the presence of two witnesses.

LINDEN KIRLIN.

Witnesses:
F. G. FISCHER,
G. Y. THORPE.